United States Patent
Weitzel et al.

(12) 
(10) Patent No.: US 6,740,692 B2
(45) Date of Patent: May 25, 2004

(54) SOLVENT FREE COATING COMPOSITIONS FOR SOILING-RESIST ANT FACADES

(75) Inventors: Hans-Peter Weitzel, Reischach (DE); Harald Zeh, Burghausen (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 0 days.

(21) Appl. No.: 10/146,853

(22) Filed: May 16, 2002

(65) Prior Publication Data

US 2003/0018121 A1 Jan. 23, 2003

(30) Foreign Application Priority Data

Jul. 5, 2001 (DE) ......................................... 101 32 506

(51) Int. Cl.$^7$ ................................ C08L 3/02; C08L 5/16
(52) U.S. Cl. ....................................................... 524/48
(58) Field of Search ............................. 524/48, 27, 83, 524/359

(56) References Cited

U.S. PATENT DOCUMENTS

| | | |
|---|---|---|
| 3,320,198 A | 5/1967 | Hill |
| 4,582,900 A | 4/1986 | Brandt et al. |

FOREIGN PATENT DOCUMENTS

| | | |
|---|---|---|
| DE | 43 18 083 A1 | 5/1994 |
| DE | 4318083 | 5/1994 |
| DE | 4313408 | 10/1994 |
| DE | 43 24 650 A1 | 1/1995 |
| DE | 19520989 | 12/1996 |
| DE | 19917952 | 10/2000 |
| DE | 199 18 052 A1 | 10/2000 |
| EP | 0 146 841 A2 | 7/1985 |
| EP | 186146 | 7/1986 |
| EP | 0 599 676 A1 | 6/1994 |
| EP | 632329 | 1/1995 |
| JP | 2000302601 | 7/1986 |
| JP | 11130608 | 5/1999 |
| WO | WO 97/46095 | 12/1997 |

OTHER PUBLICATIONS

Derwent Abstract Corresponding To DE 199 18 052 [AN 2000–681131].

Derwent Abstract Corresponding To DE 43 18 083 [AN 1994–160152].

Derwent Abstract Corresponding To EP 599 676 [AN 1994–170152].

Fox T.G., Bull. Am. Physics Soc. 1,3, p. 123 [1956].

Polymer Handbook, 2$^{nd}$ Edition, J. Wiley & Sons, New York [1975].

Derwent Abstract Corresponding To DE 43 24 650 [AN 1995–031604].

J. Sejtli, Cyclodextrin Technology, Kluwer Academic Publishers, 1988, p. 86ff.

Derwent Abstract corresponding to DE 4318083 [AN 1994–160152].

Derwent Abstract corresponding to DE 19918052 [AN 2000–681131].

Journal of Polymer Science: Part A: Polymer Chemistry, vol. 26, pp. 1465–1470 [1988].

Derwent Abstract corresponding to EP 632329 [AN 1995–037965].

Derwent Abstract corresponding to DE 19520989 [AN 1997–035185].

Derwent Abstract corresponding to JP 11–130608 [AN 1999–352730].

Derwent Abstract corresponding to JP 2000302601 [AN 2001–204919].

*Primary Examiner*—Kriellion A. Sanders
(74) *Attorney, Agent, or Firm*—Brooks Kushman P.C.

(57) ABSTRACT

Solventlessly preparable coating compositions for producing soiling-resistant coatings, comprise:

a) at least one film-forming polymer of one or more vinyl ester, (meth)acrylate, vinylaromatic, olefin, 1,3-diene, or vinyl halide monomers, and, if desired, further monomers copolymerizable therewith, in the form of an aqueous dispersion or water-redispersible powder, b) one or more photoinitiators and/or fungicides, c) at least one pigment, d) one or more fillers, and, if desired, e) further additives, wherein the photoinitiators and fungicides b) are in the form of complexes with cyclodextrin or its derivatives.

19 Claims, No Drawings

SOLVENT FREE COATING COMPOSITIONS FOR SOILING-RESISTANT FACADES

BACKGROUND OF THE INVENTION

1. Field of the Invention

The invention relates to coating compositions for producing soiling-resistant coatings which can be prepared in the absence of organic solvents, to processes for preparing such compositions, and to their use. The coatings are especially useful for building facades.

2. Background Art

It is common to use film-forming polymers in dispersion or powder form as binders for preparing polymer-modified facade coatings or plasters. These binders raise the mechanical stability of the coating and increase the wet abrasion resistance. A disadvantage in many cases, is an increased soiling tendency of the facade as a result of the polymer modification.

Common techniques for avoiding or at least reducing the tendency toward soiling include the use of harder polymers with a higher Tg. This, however, necessitates the use of volatile organic film-forming auxiliaries, and is no longer acceptable from an environmental standpoint. In many cases, photochemically crosslinkable binders are used as well. Such binders, however, have the disadvantage that the photoinitiator, which has poor solubility in water, can only be introduced into the composition by using solvents.

DE-A 19918052 relates to pigmented coating compositions having good wet abrasion resistance and a low soiling tendency, based on (meth)acrylate polymers and containing a small fraction of nonpolymerizable photoinitiator. DE-A 4318083 discloses coating compositions based on (meth) acrylate copolymers with increased UV sensitivity due to use of a mixture of hydrophilic and hydrophobic photoinitiators. U.S. Pat. No. 3,320,198 discloses a process for preparing coating compositions for exterior paints by adding a benzophenone solution to an acrylic latex. A disadvantage here is that solvents are always introduced into the coating composition with the water-insoluble photoinitiator. EP-A 599676 describes UV-crosslinkable coating compositions based on acrylic copolymers with a copolymerizable photoinitiator. Although the latter process avoids the introduction of solvents into the coating composition, it also entails high costs for the polymerizable photoinitiator.

It would be desirable to provide a coating composition for producing soiling-resistant facades which avoids the known disadvantages of the prior art and leads to facades which are less susceptible to soiling.

SUMMARY OF THE INVENTION

It has surprisingly been found that, by employing a photoinitiator and/or fungicide complexed with cyclodextrin, coating compositions may be obtained which impart markedly improved weathering characteristics to the facades coated or plastered with them. The coating compositions may be prepared without adding solvent.

DETAILED DESCRIPTION OF THE PREFERRED EMBODIMENT(S)

The invention provides coating compositions for producing soiling-resistant coatings which may be prepared in the absence of organic solvents, comprising a) at least one film-forming polymer of one or more vinyl ester monomers, (meth)acrylate monomers, vinylaromatic monomers, olefin monomers, 1,3-diene monomers, and vinyl halide monomers, and optionally, further monomers copolymerizable therewith, in the form of its aqueous dispersion or water-redispersible powder, b) one or more photoinitiators and/or fungicides, c) at least one pigment, d) one or more fillers, and optionally, e) further additives, wherein the photoinitiator(s) and/or fungicide(s) b) are in the form of complexes with cyclodextrin or a cyclodextrin derivative.

By "solventlessly preparable" is meant that photoinitiator and fungicide can be added without adding solvent, so that solvent-free and low-emission coating compositions are obtainable whose fraction of volatile nonaqueous constituents is less than 1% by weight, based on the overall weight of the coating composition.

Suitable vinyl esters are those of carboxylic acids having from 1 to 12 carbon atoms. Preference is given to vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having from 9 to 11 carbon atoms, an example being VeoVa9® or VeoVa10® (trade names of Shell). Vinyl acetate is particularly preferred.

Suitable monomers from the group of acrylates or methacrylates are esters of unbranched or branched alcohols having from 1 to 15 carbon atoms. Preferred methacrylates and acrylates are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, and 2-ethylhexyl acrylate. Particular preference is given to methyl acrylate, methyl methacrylate, n-butyl acrylate, t-butyl acrylate, and 2-ethylhexyl acrylate.

Preferred vinylaromatics are styrene, methylstyrene, and vinyltoluene. A preferred vinyl halide is vinyl chloride. The preferred olefins are ethylene and propylene and the preferred dienes are 1,3-butadiene and isoprene.

If desired, it is also possible for from 0.1 to 5% by weight, based on the overall weight of the monomer mixture, of auxiliary monomers to be copolymerized. It is preferred to use from 0.5 to 2.5% by weight of auxiliary monomers. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric acid and maleic acid such as the diethyl and diisopropyl esters and also maleic anhydride; ethylenically unsaturated sulfonic acids and their salts, preferably vinylsulfonic acid and 2-acrylamido-2-methylpropanesulfonic acid. Further examples are pre-crosslinking comonomers such as polyethylenically unsaturated comonomers, examples being divinyl adipate, diallyl maleate, allyl methacrylate, and triallyl cyanurate, or post-crosslinking comonomers, examples being acrylamidoglycolic acid (AGA), methacrylamidoglycolic acid methyl ester (MAGME), N-methylolacrylamide (NMA), N-methylolmethacrylamide, -methylolallylcarbamate, alkyl ethers or esters such as the isobutoxy ethers or esters of N-methylolacrylamide, of N-methylolmethacrylamide and of N-methylolallylcarbamate. Also suitable are epoxy-functional comonomers such as glycidyl methacrylate and glycidyl acrylate. Further examples are silicon-functional comonomers, such as acryloyloxypropyltri(alkoxy)silanes and methacryloyloxypropyltri(alkoxy)silanes, vinyltrialkoxysilanes, and vinylmethyldialkoxysilanes, in which the alkoxy groups may, for example, include ethoxy and ethoxypropylene glycol ether radicals. Mention may also be made of monomers containing hydroxyl or CO groups, examples being hydroxyalkyl methacrylates and acrylates such as hydroxyethyl, hydroxypropyl or hydroxybutyl acrylate or methacrylate, and also compounds such as diacetone-acrylamide and acetylacetoxyethyl acrylate or methacrylate.

The monomers and the weight fractions of the comonomers are selected so as to give, in general, a glass transition temperature, Tg, of from −30° C. to +40° C., preferably from −10° C. to +25° C. The glass transition temperature Tg of the polymers may be determined in a known manner by means of differential scanning calorimetry (DSC). The Tgs may also be calculated approximately in advance using the Fox equation. According to T. G. Fox, BULL. AM. PHYSICS SOC. 1, 3, page 123 (1956): $1/Tg = x_1/Tg_1 + x_2/Tg_2 + \ldots + x_n/Tg_n$, $x_n$ being the mass fraction (% by weight/100) of the monomer n and $Tg_n$ being the glass transition temperature, in Kelvin, of the homopolymer of the monomer n. Tgs for homopolymers are listed in Polymer Handbook, $2^{nd}$ Edition, J. Wiley & Sons, New York (1975).

Preference is given to homopolymers or copolymers containing one or more monomers from the group consisting of vinyl acetate, vinyl esters of a-branched monocarboxylic acids having from 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and styrene. Particular preference is given to mixtures of vinyl acetate and ethylene; of vinyl acetate, ethylene, and a vinyl ester of α-branched monocarboxylic acids having from 9 to 11 carbon atoms; of n-butyl acrylate and 2-ethylhexyl acrylate and/or methyl methacrylate; of styrene and one or more monomers from the group consisting of methyl acrylate, ethyl acrylate, propyl acrylate, n-butyl acrylate, and 2-ethylhexyl acrylate; of vinyl acetate and one or more monomers from the group consisting of methyl acrylate, ethyl acrylate, propyl acrylate, n-butyl acrylate, 2-ethylhexyl acrylate, and, if desired, ethylene; of 1,3-butadiene and styrene and/or methyl methacrylate, and also, where appropriate, with further acrylates. The mixtures specified may, if desired, also contain one or more of the abovementioned auxiliary monomers.

Most preference is given to polymers of the above compositions which also contain from 0.1 to 5% by weight, based on the overall weight of the polymer, of monomer units deriving from one or more comonomers from the group consisting of ethylenically unsaturated monocarboxylic and dicarboxylic acids such as acrylic acid, methacrylic acid, fumaric acid, and maleic acid; ethylenically unsaturated carboxamides and carbonitriles such as acrylamide and acrylonitrile; monoesters of fumaric acid and maleic acid; maleic anhydride; and ethylenically unsaturated sulfonic acids and/or their salts, preferably vinylsulfonic acid and 2-acrylamido-2-methylpropanesulfonic acid.

The polymers a) are prepared by emulsion polymerization or suspension polymerization in the presence of protective colloids and/or emulsifiers, preferably by emulsion polymerization, with the polymerization temperature being generally from 40° C. to 100° C., preferably from 60° C. to 90° C., and in the case of copolymerization with gaseous comonomers such as ethylene it being possible to operate under superatmospheric pressure, generally between 5 bar and 100 bar. The polymerization is initiated using the water-soluble and/or monomer-soluble initiators or the redox initiator combinations that are customary for emulsion or suspension polymerization. Examples of water-soluble initiators are sodium persulfate, hydrogen peroxide, and azobisisobutyronitrile. Examples of monomer-soluble initiators are dicetyl peroxydicarbonate, dicyclohexyl peroxydicarbonate, and dibenzyl peroxide. The initiators are used generally in an amount of from 0.01 to 0.5% by weight, based on the overall weight of the monomers. Redox initiators used include combinations of the abovementioned initiators with reducing agents. Examples of suitable reducing agents include sodium sulfite, sodium hydroxymethanesulfinate, and ascorbic acid. The amount of reducing agent is preferably from 0.01 to 0.5% by weight, based on the overall weight of the monomers.

In order to control the molecular weight it is possible to use regulating substances (chain transfer agents) during the polymerization. Where regulators are used, the amounts thereof are normally between 0.01 and 5.0% by weight, based on the monomers to be polymerized, and they may be metered in separately or else as a premix with reaction components. Examples of such regulator substances are n-dodecyl mercaptan, tert-dodecyl mercaptan, mercaptopropionic acid, methyl mercaptopropionate, isopropanol, and acetaldehyde. Preferably, no regulator substances are used.

Suitable protective colloids are partially hydrolyzed or fully hydrolyzed polyvinyl alcohols; polyvinylpyrrolidones; polyvinylacetals; polysaccharides in water-soluble form such as starches (amylose and amylopectin), celluloses and their carboxymethyl, methyl, hydroxyethyl, and hydroxypropyl derivatives; proteins such as casein or caseinate, soya protein, and gelatin; lignin sulfonates; synthetic polymers such as poly(meth)acrylic acid, copolymers of (meth)acrylates with carboxy-functional comonomer units, poly(meth)acrylamide, polyvinylsulfonic acids, and the water-soluble copolymers thereof; melamine-formaldehyde sulfonates, napthalene-formaldehyde sulfonates, and styrene-maleic acid and vinyl ether-maleic acid copolymers. Partially hydrolyzed or fully hydrolyzed polyvinyl alcohols are preferred. Particular preference is given to partially hydrolyzed polyvinyl alcohols having a degree of hydrolysis of from 80 to 95 mol % and a Höppler viscosity in 4% strength aqueous solution of from 1 to 30 mPa s (Höppler method at 20° C., DIN 53015).

Suitable emulsifiers, which can be used at from 0.5 to 10% by weight based on the monomer amount, include anionic, cationic, and nonionic emulsifiers, examples being anionic surfactants such as alkyl sulfates having a chain length of from 8 to 18 carbon atoms, alkyl or alkylaryl ether sulfates having from 8 to 18 carbon atoms in the hydrophobic radical and up to 40 ethylene oxide or propylene oxide units, alkyl- or alkylarylsulfonates having from 8 to 18 carbon atoms, esters and monoesters of sulfosuccinic acid with monohydric alcohols or alkylphenols, or nonionic surfactants such as alkyl polyglycol ethers or alkylaryl polyglycol ethers having from 8 to 40 ethylene oxide units.

After the end of the polymerization, residual monomer may be removed using known methods of postpolymerization, an example being postpolymerization initiated with redox catalyst. Volatile residual monomers may also be removed by means of distillation, preferably under reduced pressure, and, where appropriate, by passing inert entraining gases such as air, nitrogen or steam over or through the polymerization products.

The aqueous dispersions obtainable by the process of the invention have a solids content of from 30 to 75% by weight, preferably from 50 to 60% by weight. For preparing the water-redispersible polymer powders, the aqueous dispersions, following addition where appropriate of protective colloids as spraying aids, are dried, by means of fluidized bed drying, freeze drying or spray drying, for example. The dispersions are preferably spray dried. Spray drying is carried out in customary spray drying units, with atomization taking place by means of single-fluid, two-fluid or multifluid nozzles or with a rotating disk. The exit temperature is generally chosen to be in the range from 45° C. to 120° C., preferably from 60° C. to 90° C., depending on unit, resin Tg, and desired degree of drying.

The spraying aid is generally used in a total amount of from 3 to 30% by weight, based on the polymeric constituents of the dispersion. In other words, the total amount of protective colloid before the drying operation should be at least 3 to 30% by weight, based on the polymer fraction. It is preferred to use from 5 to 20% by weight of protective colloid based on the polymer fraction.

Examples of suitable spraying aids are the protective colloids already mentioned. Preferably, no protective colloids other than polyvinyl alcohols are used as spraying aids. At the spraying stage, in many cases it has proven advantageous to include up to 1.5% by weight of antifoam, based on the base polymer. In order to extend the storage life by improving the blocking stability, especially in the case of powders having a low glass transition temperature, the resulting powder may be provided with an antiblocking (anticaking) agent, preferably at up to 30% by weight, based on the overall weight of polymeric constituents. Examples of antiblocking agents are Ca and Mg carbonates, talc, gypsum, silica, kaolins, and silicates having particle sizes preferably in the range from 10 nm to 10 µm.

The viscosity of the feed to be sprayed is adjusted by way of the solids content so as to give a value of less than 500 mpa.s (Brookfield viscosity at 20 rpm and 23° C.), preferably less than 250 mPa.s. The solids content of the dispersion to be sprayed is greater than 35%, preferably greater than 40%.

Suitable photoinitiators b) are those which bring about the crosslinking of the polymers a) on exposure to sunlight. These photoinitiators include commercially available compounds such as benzophenone and substituted benzophenones, acetophenone and substituted acetophenones, the derivatives generally being substituted one or more times by substituents from among hydroxyl, amino, nitro, chloro, carboxyl, hydroxyalkyl such as hydroxymethyl, $C_1$ to $C_4$ alkyl such as methyl, and $C_1$ to $C_4$ alkoxy such as methoxy, radicals. Preference is given to benzophenone and its derivatives and also to acetophenone derivatives. Particularly preferred benzophenone derivatives are those in which only one phenyl ring is substituted, and especially those in which the single substituted phenyl ring is substituted in the 4 position. Examples of preferred photoinitiators are 1,1-dimethyl-1-hydroxyacetophenone, 1,1-dimethoxy-1-phenylacetophenone, benzophenone, 4-hydroxybenzophenone, 4-aminobenzophenone, 4-nitrobenzophenone, 4-chlorobenzophenone, 4-carboxybenzophenone, 4-hydroxymethylbenzophenone, 4-methylbenzophenone, 4,4'-dimethylbenzophenone, and 4,4'-dichlorobenzophenone. The photoinitiators are generally used in an amount of from 0.5 to 5.0% by weight, preferably from 0.1 to 2.0% by weight, based in each case on the polymer fraction a).

Suitable fungicides b) are available commercially. To counter infestation by bacteria, yeasts, and fungi it is common to use active substances from the isothiazolinones preservative class. Examples of such are n-octylisothiazolinone, dichloro-n-octylisothiazolinone, chloromethylisothiazolinone, methylisothiazolinone and benzisothiazolinone. Further suitable fungicides include benzimidazole derivatives, e.g., 2-(methoxycarbonylamino)-benzimidazole, 2,4-diamino-6-methylthio-1,3,5-triazine derivatives, o-phenylphenol, substituted ureas and phenyl ureas, phthalimide derivatives, e.g., N-(trichloromethylthio)phthalimide, iodocarbamate, pyrethroids, chloroacetamide, sodium borate, methylisopropylphenol, barium metaborate, and dithiocarbamate. The fungicides are normally used in an amount of from 0.001 to 0.2% by weight, based on the overall weight of the coating composition.

Suitable pigments c) are known to the skilled worker. Both organic and inorganic pigments may be used. Examples of inorganic white pigments are titanium dioxide, zinc oxide, zinc sulfide, lead carbonate, and barium sulfate. Examples of inorganic color pigments are yellow, red and black iron oxides, carbon black, graphite, chromium yellow and cadmium yellow or chromium orange and cadmium orange, molybdate orange and molybdate red, cobalt, iron, and ultramarine blue, chromium oxide green, mixed phase green pigments with a spinel structure, and manganese violet. Suitable organic color pigments include azo, anthraquinone, quinacridone, phthalocyanine, perylene, and indigo dyes. The pigment fraction is dependent on the opacity of the pigment and the depth of color and is generally from 1 to 30% by weight, based on the overall weight of the coating composition.

Examples of fillers d) which can be used include carbonates such as calcium carbonate in the form of dolomite, calcite, and chalk. Further examples are silicates, such as magnesium silicate in the form of talc, or aluminum silicates such as kaolin, mica, loam, and clays; quartz flour, quartz sand, highly disperse silica, feldspar, heavy spar, and light spar. Also suitable are fiber fillers of natural (i.e., cellulose fiber) or synthetic (i.e., polyethylene, polyacrylonitrile) origin. In practice, mixtures of different fillers are frequently employed. Examples include mixtures of fillers of different particle size or mixtures of carbonate and silicate fillers. Polymer plasters generally comprise coarser fillers than do emulsion paints. The particle size in these cases is often between 0.2 and 5.0 mm. The filler fraction is generally from 5 to 80% by weight, based on the overall weight of the coating composition.

In general, the pigment plus filler fraction is calculated so as to give a pigment volume concentration, PVC, of 10% or more. In the case of exterior paint, the PVC is preferably from 25 to 70% by weight, calculated as PVC $(\%)=(V_{P+F} \times 100)/(V_{P+F}+V_B)$ where $V_{P+F}$=volume of pigment+filler and $V_B$=volume of binder.

The additives e) include inorganic binders such as cement, lime, and gypsum. Further additives e) include thickeners, examples being polysaccharides such as cellulose ethers and modified cellulose ethers, starch ethers, guar gum, xanthan gum, phyllosilicates, polycarboxylic acids such as polyacrylic acid and the partial esters thereof, polyvinyl alcohols, which may where appropriate have been acetalized and/or hydrophobically modified, casein, and associative thickeners. Inorganic thickeners may also be used, bentonite being but one example. It is also possible to use mixtures of these thickeners. Preference is given to the cellulose ethers, the modified cellulose ethers, the polyvinyl alcohols which may where appropriate have been acetalized and/or hydrophobically modified, and mixtures thereof. It is preferred to use from 0.05 to 2.5% by weight of thickener, with particular preference from 0.05 to 0.5% by weight.

Examples of further additives e) are wetting agents, generally in amounts of from 0.1 to 0.5% by weight, based on the overall weight of the formulation. Examples of such wetting agents include sodium and potassium polyphosphates and polyacrylic acids and salts thereof. Further additives are defoamers and antifreeze agents.

In the coating composition of the invention, the photoinitiator b) and/or fungicide b) are each present in the form of a cyclodextrin complex. Suitable cyclodextrins are α-cyclodextrin (cyclohexaamylose), β-cyclodextrin (cycloheptaamylose), γ-cyclodextrin (cyclooctaamylose), and, in each case, their derivatives or mixtures of the cyclodextrins and cyclodextrin derivatives. Examples of cyclodextrin derivatives include cyclodextrin alkyl ethers such as the methyl ethers, ethyl ethers or propyl ethers of α-, β-, and γ-cyclodextrin. Examples of hydroxyalkyl ethers include hydroxyethyl, hydroxypropyl, and dihydroxypropyl ethers of α-, β-, and γ-cyclodextrin. Examples of carboxyalkyl ethers are carboxymethyl and carboxypropyl ethers of α-, β-, and γ-cyclodextrin and their alkali metal salts, such as the sodium carboxymethyl ethers. Other suitable cyclodextrin ethers include mixed ethers of α-, β-, and γ-cyclodextrin which contain at least two different groups of the alkyl ether, hydroxyalkyl ether or carboxyalkyl ether groups mentioned. Examples of cyclodextrin esters are the acetic esters (acetylcyclodextrins) and propionic esters (propionylcyclodextrins) of α-, β-, andγ-cyclodextrin. Examples of substituted cyclodextrin ethers or cyclodextrin esters are 2-aminoethyl- or 2-chloroacetyl-cyclodextrins. Preferred cyclodextrin derivatives are the cyclodextrin alkyl ethers and hydroxyalkyl ethers of α-, β-, and γ-cyclodextrin, especially cyclodextrin methyl ethers. Most preferred are α-, β-, and γ-cyclodextrin.

The cyclodextrins are available commercially or can be obtained by means of known techniques such as enzymatic cleavage of starch using cyclodextrin glycosyl transferases (CGTases). Methods of this kind are described, for example, in DE-A 4324650. The cyclodextrin derivatives are likewise available commercially or can be obtained by means of known methods; methods for the preparation are described, for example, in EP-A 146841 (U.S. Pat. No. 4,582,900).

The preparation of the cyclodextrin complexes with the components b) takes place in accordance with methods which are customary per se, as described, for example, in J. Sejtli, "CYCLODEXTRIN TECHNOLOGY", Kluwer Academic Publishers, 1988, p. 86 ff. For example, the cyclodextrin complexes may be prepared by stirring or shaking aqueous solutions of cyclodextrin (derivative) with the photoinitiator or fungicide at temperatures from 10° C. to 80° C. For stirring, customary stirring devices or dispersers are employed. In another method of preparing the complexes, the cyclodextrins (or derivatives) are formed into a paste with water in a ratio of preferably from 6:4 to 9:1 and the paste is kneaded with component b) at from 20° C. to 80° C. for sufficient time, for example from 10 to 200 minutes. The paste may be dried under reduced pressure. Additionally, the cyclodextrin (derivative) and component b) may be dissolved in an organic solvent for them both, such as $C_1$–$C_6$ alcohols, $C_3$–$C_6$ ketones, ethyl acetate, methyl acetate, and glycols, for example. The solvent may subsequently be removed by drying, for example under reduced pressure. This generally produces solids which can be dissolved in water.

The fraction of cyclodextrin (derivative) in the complexes (mixtures) with the photoinitiator or fungicide is generally from 1 to 30% by weight, preferably from 2 to 20% by weight, based in each case on the overall weight of the component b) and cyclodextrin (derivative).

In order to prepare the coating compositions, the polymer a) is mixed in the form of a dispersion or powder with the other formulation ingredients b) to e) in suitable mixers, preferably without adding nonaqueous volatile solvents, and the mixture is homogenized. The polymer powder may also where appropriate be added in the form of an aqueous redispersion on the building site. In many cases, a dry mix is produced and the water needed for processing is added immediately prior to processing. Where pastelike compositions are produced, it is common first of all to introduce the water fraction, then to add the dispersion, and finally to incorporate the solids by stirring.

The coating composition is suitable for use, for example, in emulsion paints, sealing compounds or polymer plasters. Particular preference is given to its application in the exterior sector, particularly on mineral substrates.

The examples which follow serve for further illustration of the invention. The soiling tendency was tested on coatings of the composition whose formulation is summarized in Table 1.

The exposure specimens for testing were weathered outdoors at an angle of 60° C. (facing south) and assessed as a function of time. The measurement used is the soiling index $D_c = L^*_x / L^*_o$, measured in accordance with ASTM D 3719-00, where $L^*_o$ is the reference likeness of the unweathered sample, and $L^*_x$ is the reference likeness of the weathered sample after the weathering period x (x=15 months). The range of values for $D_c$ is generally between 75 and 100. The higher the $D_c$, the lower the soiling. The results are summarized in Table 2.

TABLE 1

| Component | Function | Amount [g] |
| --- | --- | --- |
| Water | | 53.9 (62.9) |
| Na polyacrylate (40%) | dispersant | 2.0 |
| Biocide | in-can preservative | 2.0 |
| Phyllosilicate (5%) | rheological additive | 15.0 |
| Cellulose ether (2%) | rheological additive | 30.0 |
| Acrylic thickener | rheological additive | 1.0 |
| Lusolvan FBH | filming auxiliary | 3.0 |
| Cellulose fiber | filler | 5.0 |
| Fiber filler | filler | 1.0 |
| Titanium dioxide | pigment | 30.0 |
| Dispersion, 50% | binder | 129.5 |
| Calcium carbonate (50 μm) | filler | 225.0 |
| Calcium carbonate (130 μm) | filler | 170.0 |
| Calcium carbonate (1.8–2.5 mm) | filler | 320.0 |
| Defoamer | | 2.0 |
| Ammonia | | 0.5 |
| See example | photoinitiator | 10.0 (1.0) |
| See example | fungicide | 0.1 |
| Total | | 1000.0 |

In the inventive and comparative examples 1 to 5, an emulsifier-stabilized aqueous dispersion of a vinyl acetate-ethylene copolymer having an MFFT of 7° C. was used. Examples labeled with "C," i.e., "C1," indicate a Comparative Example. This dispersion was prepared conventionally by emulsion polymerization of vinyl acetate and ethylene in a weight ratio of 90:10 using 1.5% by weight of an ethoxylated (50 EO units) fatty alcohol at 55° C. under 10 bar. The initiator used was a combination of 0.2% by weight t-butyl hydroperoxide and 0.3% by weight sodium hydroxymethanesulfinate.

In the inventive and comparative examples 6 to 11, a cellulose-stabilized aqueous dispersion of a vinyl acetate-VeoVa10®-ethylene copolymer having an MFFT of 3° C. was used. This dispersion was prepared conventionally by emulsion polymerization of vinyl acetate, VeoVa10® and ethylene in a weight ratio of 72:18:10 using 2.2% by weight of an ethoxylated (23 EO units) nonylphenol and 1.6% by weight of a hydroxyethylcellulose (Natrosol® 250GR) at 50° C. under 54 bar. The initiator used was a combination of 0.25% by weight ammonium persulfate and 0.15% by weight ascorbic acid.

EXAMPLE C1 (COMPARATIVE)

The photoinitiator used was 1,1-dimethyl-1-hydroxyacetophenone (Darocur® 1173) (28% strength solution in ethanol); 1% by weight of photoinitiator based on the formulation.

EXAMPLE 2

The photoinitiator used was a complex of Darocur® 1173 and beta-cyclodextrin (10% by weight based on the total weight of cyclodextrin and photoinitiator); 1% by weight of photoinitiator based on the formulation.

EXAMPLE C3 (COMPARATIVE)

No photoinitiator was used.

EXAMPLE C4 (COMPARATIVE)

The photoinitiator used was 1,1-dimethoxy-1-phenylacetophenone (Irgacure® 651) (28% strength solution in methanol); 1% by weight of photoinitiator based on the formulation.

EXAMPLE 5

The photoinitiator used was a complex of Irgacure® 651 and beta-cyclodextrin (2% by weight based on the total weight of cyclodextrin and photoinitiator); 0.1% by weight of photoinitiator based on the formulation.

In a second series, the effect of the added fungicide was investigated. The results are not comparable with the first series, since they are dependent on weathering.

EXAMPLE 6

The fungicide used was a complex of n-octylisothiazolinone (n-OIT) and beta-cyclodextrin (16% by weight based on the total weight of cyclodextrin and fungicide), 0.1% by weight of n-OIT based on the formulation.

EXAMPLE C7 (COMPARATIVE)

No film preservative was used but an in-can preservative was (chloromethylisothiazolinone, Parmetol® A 23).

EXAMPLE C8 (COMPARATIVE)

The fungicide used was uncomplexed n-octylisothiazolinone, 1000 ppm n-OIT based on the formulation.

EXAMPLE 9

The fungicide used was a complex of dichloro-n-octylisothiazolinone (DC-n-OIT) and beta-cyclodextrin (19% by weight based on the total weight of cyclodextrin and fungicide), 0.1% by weight of DC-n-OIT based on the formulation.

EXAMPLE C10 (COMPARATIVE)

The fungicide used was uncomplexed dichloro-n-octylisothiazolinone, 1000 ppm DC-n-OIT based on the formulation.

EXAMPLE C11 (COMPARATIVE)

Neither in-can nor film preservative was used.

TABLE 2

| Example | Soiling index $D_c$ after 15 months of weathering |
|---|---|
| C1 | 86 |
| 2 | 88 |
| C3 | 85 |
| C4 | 87 |
| 5 | 90 |
| 6 | 86 |
| C7 | 83 |
| C8 | 84 |
| 9 | 86 |
| C10 | 84 |
| C11 | 83 |

The examples demonstrate the reduced dirt pickup tendency when the inventive procedure is adopted. At the same time, the inventive compositions are solvent-free.

While embodiments of the invention have been illustrated and described, it is not intended that these embodiments illustrate and describe all possible forms of the invention. Rather, the words used in the specification are words of description rather than-limitation, and it is understood that various changes may be made without departing from the spirit and scope of the invention.

What is claimed is:

1. A coating composition for producing soiling-resistant coatings, comprising:
   a) at least one film-forming polymer comprising the polymerized product of one or more vinyl ester monomers, (meth)acrylate monomers, vinylaromatic monomers, olefin monomers, 1,3-diene monomers, and vinyl halide monomers, and optionally, further monomers copolymerizable therewith, in the form of an aqueous dispersion or water-redispersible powder,
   b) at least one complex of a photoinitiator with a cyclodextrin or derivative thereof, and optionally a complex of a fungicide with a cyclodextrin or mixture thereof,
   c) at least one pigment, and
   d) one or more fillers.

2. The coating composition of claim 1, comprising as at least one film-forming polymer a) one or more homopolymers or copolymers derived from one or more monomers selected from the group consisting of vinyl acetate, vinyl esters of α-branched monocarboxylic acids having from 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and styrene.

3. The coating composition of claim 1, comprising as at least one film-forming polymer a) one or more homopolymers or copolymers which also contain from 0.1 to 5% by weight, based on the overall weight of the polymer, of units derived from one or more comonomers selected from the group consisting of ethylenically unsaturated monocarboxylic and dicarboxylic acids, ethylenically unsaturated carboxamides and carbonitriles, monoesters of fumaric acid and maleic acid, maleic anhydride, and ethylenically unsaturated sulfonic acids and their salts.

4. The coating composition of claim 1, comprising as photoinitiator b) from 0.05 to 5.0% by weight, based on the polymer fraction a), of one or more photoinitiators selected from the group consisting of benzophenone and substituted benzophenone derivatives, acetophenone and substituted acetophenone derivatives, said substituted benzophenone and acetophenone derivatives being substituted one or more times by substituents selected from the group consisting of hydroxyl, amino, nitro, chloro, carboxyl, hydroxyalkyl, $C_1$ to $C_4$ alkyl, and $C_1$ to $C_4$ alkoxy.

5. The coating composition of claim 1, comprising as fungicide b) from 0.001 to 0.2% by weight, based on the overall weight of the coating composition, of one or more isothiazolinones preservatives.

6. The coating composition of claim 1, wherein the pigment plus filler fraction is adjusted so as to give a pigment volume concentration of 10% or more.

7. The coating composition of claim 1, wherein the photoinitiator and/or fungicide are present in the form of complexes with α-cyclodextrin, β-cyclodextrin, γ-cyclodextrin, their derivatives, or mixtures of said cyclodextrins and cyclodextrin derivatives.

8. A process for preparing a coating composition as claimed in claim 1, comprising mixing the polymer a) in the form of a dispersion or powder with the other formula ingredients b) to d) in a mixer, without adding nonaqueous volatile solvents, and homogenizing the mixture.

9. An emulsion paint, sealing compound, or polymer plaster comprising the composition of claim 1.

10. In a process for treating an exterior surface with an emulsion paint, sealing compound, or polymer plaster, the improvement comprising selecting as said emulsion paint, sealing compound, or polymer plaster, an emulsion paint, sealing compound, or polymer plaster comprising the composition of claim 1.

11. A coating composition for producing soiling-resistant coatings, comprising:

a) at least one film-forming polymer comprising the polymerized product of one or more vinyl ester monomers, (meth)acrylate monomers, vinylaromatic monomers, olefin monomers, 1,3-diene monomers, and vinyl halide monomers, and optionally, further monomers copolymerizable therewith, in the form of an aqueous dispersion or water-redispersible powder, b) one or more photoinitiators and/or fungicides, c) at least one pigment, and d) one or more fillers, wherein the photoinitiators b) comprise complexes with a cyclodextrin selected from the group consisting of α-cyclodextrin, β-cyclodextrin, γ-cyclodextrin, cyclodextrin alkyl ethers, cyclodextrin hydroxyalkyl ethers, cyclodextrin carboxyalkyl ethers, mixed ethers of cyclodextrins, cyclodextrin esters, 2-aminoethyl cyclodextrins, 2-chloroacetyl cyclodextrins, and mixtures thereof, wherein at least one photoinitiator cyclodextrin complex is present, and wherein when a fungicide complex is present at least one fungicide complex consists essentially of a complex of said at least one fungicide with a cyclodextrin selected from the group consisting of α-cyclodextrin, β-cyclodextrin, γ-cyclodextrin, cyclodextrin alkyl ethers, cyclodextrin hydroxyalkyl ethers, cyclodextrin carboxyalkyl ethers, mixed ethers of cyclodextrins, cyclodextrin esters, 2-aminoethyl cyclodextrins, 2-chioroacetyl cyclodextrins, and mixtures thereof.

12. The coating composition of claim 11, comprising as at least one film-forming polymer a) one or more homopolymers or copolymers derived from one or more monomers selected from the group consisting of vinyl acetate, vinyl esters of α-branched monocarboxylic acids having from 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and styrene.

13. The coating composition of claim 11, comprising as at least one film-forming polymer a) one or more hornopolymers or copolymers which also contain from 0.1 to 5% by weight, based on the overall weight of the polymer, of units derived from one or more comonomers selected from the group consisting of ethylenically unsaturated monocarboxylic and dicarboxylic acids, ethylenically unsaturated carboxamides and carbonitriles, monoesters of fumaric acid and maleic acid, maleic anhydride, and ethylenically unsaturated sulfonic acids and their salts.

14. The coating composition of claim 11, comprising as photoinitiator b) from 0.05 to 5.0% by weight, based on the polymer fraction a), of one or more photoinitiators selected from the group consisting of benzophenone and substituted benzophenone derivatives, acetophenone and substituted acetophenone derivatives, said substituted benzophenone and acetophenone derivatives being substituted one or more times by substituents selected from the group consisting of hydroxyl, amino, nitro, chloro, carboxyl, hydroxyalkyl, $C_1$ to $C_4$ alkyl, and $C_1$ to $C_4$ alkoxy.

15. The coating composition of claim 11, comprising as fungicide b) from 0.001 to 0.2% by weight, based on the overall weight of the coating composition, of one or more isothiazolinones preservatives.

16. The coating composition of claim 11, wherein the photoinitiator and/or fungicide are present in the form of complexes with α-cyclodextrin, β-cyclodextrin, γ-cyclodextrin or mixtures thereof.

17. A process for preparing a coating composition as claimed in claim 11, comprising mixing the polymer a) in the form of a dispersion or powder with the other formula ingredients b) to d) in a mixer, without adding nonaqueous volatile solvents, and homogenizing the mixture.

18. An emulsion paint, sealing compound, or polymer plaster comprising the composition of claim 11.

19. In a process for treating an exterior surface with an emulsion paint, sealing compound, or polymer plaster, the improvement comprising selecting as said emulsion paint, sealing compound, or polymer plaster, an emulsion paint, sealing compound, or polymer plaster comprising the composition of claim 11.

* * * * *

UNITED STATES PATENT AND TRADEMARK OFFICE
CERTIFICATE OF CORRECTION

PATENT NO.     : 6,740,692 B2
DATED          : May 25, 2004
INVENTOR(S)    : Hans-Peter Weitzel et al.

It is certified that error appears in the above-identified patent and that said Letters Patent is hereby corrected as shown below:

Title page,
Item [54], Title, should read -- SOLVENT FREE COATING COMPOSITIONS FOR SOILING-RESISTANT FACADES --

Column 12,
Line 3, delete "chiloracetyl" and insert -- choloroacetyl --.

Signed and Sealed this

Ninth Day of November, 2004

JON W. DUDAS
*Director of the United States Patent and Trademark Office*